(12) United States Patent
Seidler et al.

(10) Patent No.: US 8,880,440 B2
(45) Date of Patent: Nov. 4, 2014

(54) AUTOMATIC COMBINATION AND MAPPING OF TEXT-MINING SERVICES

(75) Inventors: Katja Seidler, Dresden (DE); Eric Peukert, Dresden (DE)

(73) Assignee: SAP AG, Walldorf (DE)

( * ) Notice: Subject to any disclaimer, the term of this patent is extended or adjusted under 35 U.S.C. 154(b) by 378 days.

(21) Appl. No.: 13/416,974

(22) Filed: Mar. 9, 2012

(65) Prior Publication Data

US 2013/0238531 A1 Sep. 12, 2013

(51) Int. Cl.
*G06N 5/00* (2006.01)
*G06F 1/00* (2006.01)

(52) U.S. Cl.
USPC .............................. 706/12; 715/205; 345/440

(58) Field of Classification Search
CPC ........... G06F 15/18; G06F 17/03; G06N 5/02; G06N 3/08
See application file for complete search history.

(56) References Cited

U.S. PATENT DOCUMENTS

2007/0219992 A1* 9/2007 Bollinger et al. .................. 707/6
2011/0302124 A1* 12/2011 Cai et al. .......................... 706/52

FOREIGN PATENT DOCUMENTS

EP 2400437 12/2011
EP 2400438 12/2011

OTHER PUBLICATIONS

Do Hong Hai, "Schema Matching and Mapping-Based Data Integration," PD Thesis, Aug. 31, 2005.

Melanie Hilario et al., "Ontology-Based Meta-Mining of Knowledge Discovery Workflows," In "Video Analytics for Business Intelligence", Jan. 1, 2011, Springer Berlin. vol. 358, pp. 273-315.
Katrin Simone Zaiss, "Instance-Based Ontology Matching and the Evaluation of Matching Systems," Inaugural dissetation Erlangung des Doktorgrades der Mathematisch . . . Nov. 30, 2010.
S. Castano S. et al., "On the Ontology Instance Matching Problem," Database and Expert Systems Application, 2008. Dexa '08. 19th International Conference on, IEEE, Sep. 1, 2008, pp. 180-184.
Christian Drumm et al., "Quickmig," Proceedings of the Sixteenth ACM Conference on Conference on Information and Knowledge Management, CIKM '07, Jan. 1, 2007, p. 107.
European Search Report (from a corresponding foreign application), EP13000646.3, mailed Jan. 27, 2014.
Hotho, A., Nuernberger, A., and Paass, G. (2005). "A Brief Survey of Text Mining." LDV Forum, 20(1):19-62.
Hu,W. and Qu, Y. (2008). "Falcon-AO: A practical Ontology Matching System." Web Semantics, 6(3):237-239.
Isaac, A., Van Der Meij,, L., Schlobach, S., and Wang, S. (2007). "An Empirical Study of Instance-Based Ontology Matching." In ISWC'07 Proc., pp. 253-266.

(Continued)

*Primary Examiner* — Jeffrey A. Gaffin
*Assistant Examiner* — Kalpana Bharadwaj
(74) *Attorney, Agent, or Firm* — Fountainhead Law Group PC

(57) ABSTRACT

Embodiments of systems and methods for automatic combination of text mining services, may comprise an instance generation component and an auto-mapping component. From common text sources, the instance generation component generates instances for taxonomy elements attached to a particular text mining service. These instances are then forwarded to the auto-mapping component, which computes a mapping between different taxonomies. This mapping may be saved to avoid repeated instance generation and mapping processes for similar taxonomies. The computed mapping may in turn be input to a result combiner element, together with extraction results from calling the different text mining services. The result combiner returns the merged result sets to the execution, and finally to the user or API.

18 Claims, 9 Drawing Sheets

(56) References Cited

OTHER PUBLICATIONS

Jean-Mary, Y. R., Shironoshita, E. P., and Kabuka, M. R. (2009). "Ontology Matching with Semantic Verification." Web Semantics, 7(3):235-251.
Li, J., Tang, J., Li, Y., and Luo, Q. (2009). "RiMOM: A Dynamic Multistrategy Ontology Alignment Framework." TKDE, 21(8):1218-1232.
Rahm, E. and Bernstein, P. A. (2001). "A Survey of Approaches to Automatic Schema Matching." The VLDB Journal, 10:334-350.
Seidler, K. and Schill, A. (2011). "Service-oriented Information Extraction." In Joint EDBT/ICDT Ph.D. Workshop' 11 Proc., pp. 25-31.
Suchanek, F. M., Abiteboul, S., and Senellart, P. (2011). "Paris: probabilistic alignment of relations, instances, and schema." Proc. VLDB Endow., 5(3):157-168.
J. Starlinger, F. Leitner, A. Valencia, and U. Leser. "SOA-Based Integration of Text Mining Services." In Services '09 Proc., pp. 99{106, 2009.
B. Habegger and M. Quafafou, "Web Services for Information Extraction from the Web," in ICWS'04 Proc. p. 79, IEEE Computer Society, 2004.
AlchemyAPI (2013); http://www.alchemyapi.com/; printed on May 17, 2013; 3 pages.
Watson W.K. Chua, et al.; "Discovering Cross-Ontology Subsumption Relationships by Using Ontological Annotations on Biomedical Literature"; in Cornet, R. and Stevens, R., editors, ICBO, vol. 897 of CEUR Workshop Proceedings; 2012; 5 pages.
Hong-Hai Do, et al.; "COMA—A System for Flexible Combination of Schema Matching Approach"; Proceedings of the 28th VLDB Conference, Hong Kong, China; 2002; 12 pages.
Christian Drumm, et al.; "QuickMig: Automatic Schema Matching for Data Migration Projects"; Proceedings of the 2007 CIKM, Lisboa, Portugal; Nov. 2007; 10 pages.
Developers, EVRI Corporate; http://www.evri.com/developers/; printed on May 17, 2013; 2 pages.
Fise, IKS Project; http://wiki.iks-project.eu/index.php/FISE; printed on May 17, 2013; 3 pages.
Seth Grimes; "Unstructured Data and the 80 Percent Rule"; Aug. 1, 2008; 4 pages.
Sabine Massmann, et al.; "Evaluating Instance-Based Matching of Web Directories"; Proceedings of the 11th International Workshop on Web and Databases, Vancouver, Canada; Jun. 13, 2008; 6 pages.
OpenCalais; http://www.opencalais.com/; Mar. 2013; 1 page.
Pavel Shvaiko, et al.; "A Survey of Schema-Based Matching Approaches"; Journal on Data Semantics IV; 2005; 26 pages.
Andreas Thor, et al.; "Instance-Based Matching of Hierarchical Ontologies"; Proceedings of the 2007 Business, Technology and Web (BTW) Conference; 2007; 13 pages.
Claire Grover, et al.; "A Framework for Text Mining Services"; Proceedings of the Third UK e-Science Programme All Hands Meeting; 2004; 8 pages.
U.S. Appl. No. 13/913,847, filed Jun. 10, 2013, entitled "System and Method of Merging Text Analysis Results", application not published; 55 pages.
Jaccard Index; www.en.wikipedia.org/wiki/Jaccard_index; printed on May 16, 2013; 4 pages.
Sorensen-Dice Coefficient; www.en.wikipedia.org/wiki/Dice%27s_coefficient; printed on May 16, 2013; 4 pages.
Pavel Shvaiko, et al.; "Ontology Matching"; Springer-Verlag Berlin Heidelberg; 2007; 332 pages.

\* cited by examiner

```
1   Merge( results, services )
2       mergedResult = empty;
3       taxonmies[ ] = retrieveTaxonomies(services)
4       taxonmies[ ] = enrichWithInstances(taxonmies, services)
5       mappings = computeMappings(taxonmies);
6       mergedResult = mergeResult(mappings, results)
7   return mergedResult;
8
9   enrichWithInstances( taxonmies, services)
10      uncovered = getUncoveredTypes(taxonomies)
11      while(uncovered not empty AND maximumIteratations>m)
12          documents = retriveDocumentsFromWiki(uncovered)
13          foreach s in services
14              instances = callService(s, documents);
15              enrich(taxonomies, instances)
16          end
17          uncovered = getUncoveredTypes(taxonomies)
18      end
```

FIG. 5

AUTOMATIC COMBINATION AND MAPPING OF TEXT-MINING SERVICES

BACKGROUND

Unless otherwise indicated herein, the approaches described in this section are not prior art to the claims in this application and are not admitted to be prior art by inclusion in this section.

Currently, business knowledge may be hidden in unstructured text sources such as word documents, web pages or forum entries. In order to make use of that knowledge, text mining techniques have been developed to extract and/or annotate entities, their relations, or sentiments, from textual sources. However in general these services differ in their mining abilities and result qualities, and are often constructed for specific domains. Text mining techniques thus still face issues of inaccuracy and incompleteness, which may affect confidence in the accuracy of the extracted information.

The present disclosure addresses these and other issues with systems and methods allowing automatic combination and mapping of text mining services.

SUMMARY

Embodiments of systems and methods for automatic combination of text mining services, may comprise an instance generation component and an auto-mapping component. From common text sources, the instance generation component generates instances for taxonomy elements attached to a particular text mining service. These instances are then forwarded to the auto-mapping component, which computes a mapping between different taxonomies. This mapping may be saved to avoid repeated instance generation and mapping processes for similar taxonomies. The computed mapping may in turn be input to a result combiner element, together with extraction results from calling the different text mining services. The result combiner returns the merged result sets to the execution, and finally to the user or API.

An embodiment of a computer-implemented method comprises, applying a first text mining service to a knowledge base to generate a plurality of instances of an entity type of a first taxonomy, and applying a second text mining service to the knowledge base to generate a plurality of instances of an entity type of a second taxonomy. The plurality of instances of the first taxonomy and the plurality of instances of the second taxonomy are used to construct an instance-matching procedure. The first text mining service is applied to a target text document to produce a plurality of first taxonomy entity types, and the second text mining service is applied to the target text document to produce a plurality of second taxonomy entity types. A mapping of the plurality of first taxonomy entity types to the plurality of the second taxonomy entity types is created based at least in part on the instance-matching procedure. The mapping is used to create a merged result that compares a result of applying the first text mining service to the target text document, with a result of applying the second text mining service to the target text document. The merged result is displayed to a user.

An embodiment of a non-transitory computer readable storage medium embodies a computer program for performing a method comprising applying a first text mining service to a knowledge base to generate a plurality of instances of an entity type of a first taxonomy, and applying a second text mining service to the knowledge base to generate a plurality of instances of an entity type of a second taxonomy. The plurality of instances of the first taxonomy and the plurality of instances of the second taxonomy are used to construct an instance-matching procedure. The first text mining service is applied to a target text document to produce a plurality of first taxonomy entity types, and the second text mining service is applied to the target text document to produce a plurality of second taxonomy entity types. A mapping of the plurality of first taxonomy entity types to the plurality of the second taxonomy entity types is created based at least in part on the instance-matching procedure. The mapping is used to create a merged result that compares a result of applying the first text mining service to the target text document, with a result of applying the second text mining service to the target text document. The merged result is displayed to a user.

An embodiment of a computer system comprises one or more processors, and a software program executable on said computer system. The software program is configured to apply a first text mining service to a knowledge base to generate a plurality of instances of an entity type of a first taxonomy, and to apply a second text mining service to the knowledge base to generate a plurality of instances of an entity type of a second taxonomy. The plurality of instances are applied of the first taxonomy and to the second taxonomy to construct an instance-matching procedure. The first text mining service is applied to a target text document to produce a plurality of first taxonomy entity types. The second text mining service is applied to the target text document to produce a plurality of second taxonomy entity types. A mapping of the plurality of first taxonomy entity types to the plurality of the second taxonomy entity types is created based at least in part on the instance-matching procedure. The mapping is used to create a merged result that compares a result of applying the first text mining service to the target text document, with a result of applying the second text mining service to the target text document. The merged result is displayed to a user.

According to some embodiments, the first taxonomy may comprise a first metadata and the second taxonomy may comprises a second metadata, and creating the mapping further comprises comparing the first metadata and the second metadata.

In certain embodiments, the first metadata may comprise a first taxonomy entity type name, a first taxonomy entity type description, or a first taxonomy entity type location within a first taxonomy hierarchy.

Particular embodiments may further comprise applying the first text mining service to a broadened common knowledge base to generate an extended plurality of instances of the entity type of the first taxonomy, applying the second text mining service to the broadened common knowledge base to generate an extended plurality of instances of the entity type of the second taxonomy, utilizing the extended plurality of instances of the first taxonomy and the extended plurality of instances of the second taxonomy to construct a refined instance-matching procedure, and creating the mapping of the plurality of first taxonomy entity types to the plurality of the second taxonomy entity types based at least in part on the refined instance-matching procedure.

In some embodiments, the plurality of first taxonomy entity types may comprise a first quantity (S), the plurality of the second taxonomy entity types may comprise a second quantity (T), and an output of the instance-matching procedure may comprise a similarity matrix comprising S*T entries, each entry reflecting a similarity between a first taxonomy entity type and a second taxonomy entity type.

Certain embodiments may further comprise using a mapping rewriting technique to revise the mapping.

The following detailed description and accompanying drawings provide a better understanding of the nature and advantages of various embodiments.

BRIEF DESCRIPTION OF THE DRAWINGS

FIG. 5 depicts a simplified embodiment of a process flow according to an embodiment.

DETAILED DESCRIPTION

The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

In order to increase the functionality of text mining and the quality of outcomes, it may be desirable to combine results of multiple text mining services. Such techniques may raise the quality of text mining by combining the strength and weaknesses of different approaches.

Currently, however, it may be difficult to effectively combine text mining services. This is because each service uses different taxonomies for annotating entities, relations, or classifying text documents, and thus mappings between different text mining taxonomies used by individual services are needed to combine extraction results.

In current practice this mapping of taxonomies and the result integration is mainly done manually. Automatic mapping of taxonomies and result integration may be inhibited by a scarcity of meta data, and a lack of available evidence to apply common matching approaches.

Here, various embodiments relate to systems and methods which automate the process of mapping different annotation taxonomies, thereby allowing automation of integration of results from multiple text mining services. Utilizing instances generated automatically, a matching strategy relying upon both metadata-based and instance-based matching techniques is created.

Figure 1:
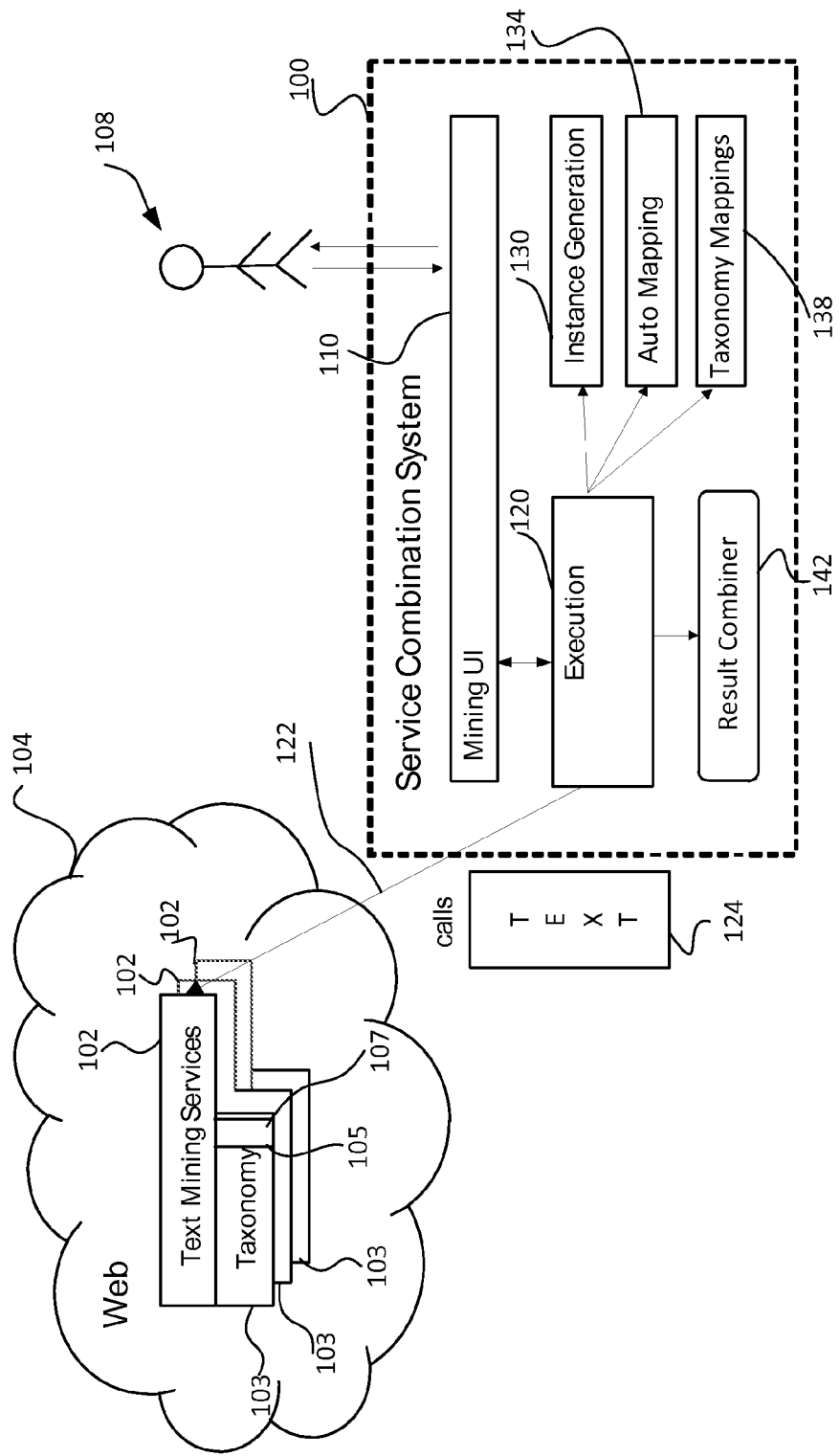
FIG. 1 shows a simplified view of an embodiment of a service combination system 100.

FIG. 1 shows a simplified view of an embodiment of a service combination system 100. This system 100 integrates with a plurality of text mining services 102 available on the web 104. Each text mining service 102 produces text mining results according to taxonomy 103 comprising individual elements (entity types or categories) 105. Each taxonomy element may include metadata 107, examples of which include but are not limited to an element name, an element description (annotation), and a structure of the element within a taxonomy hierarchy.

As used herein, such existing text mining services may allow for one or more of the following.

Named Entity Recognition (NER), where entities are identified and classified into predefined categories (e.g. person, organization).

Relation and Interaction Extraction for the identification of relationships between two or more entities.

Text Classification/Categorization where categories are assigned to text documents.

Concept Tagging for the assignment of specific terms that are derived from the text content (the terms do not have to be included in the text).

Keyword Extraction where the essence of the text is extracted through the identification of the main keywords of a text.

Sentiment Analysis for the extraction of any subjective information from text (e.g. polarity, attitudes, mood).

A human user and/or external application 108 interacts with the service combination system 100 through a respective mining user interface (UI) 110, which may be an available application program interface (API). This extraction interface allows definition of a mining task and inspection of the results thereof.

As described in detail below, the execution 120 issues calls 122 to multiple text mining services 102. These calls include text documents 124 whose content is to be mined.

Figure 1A:
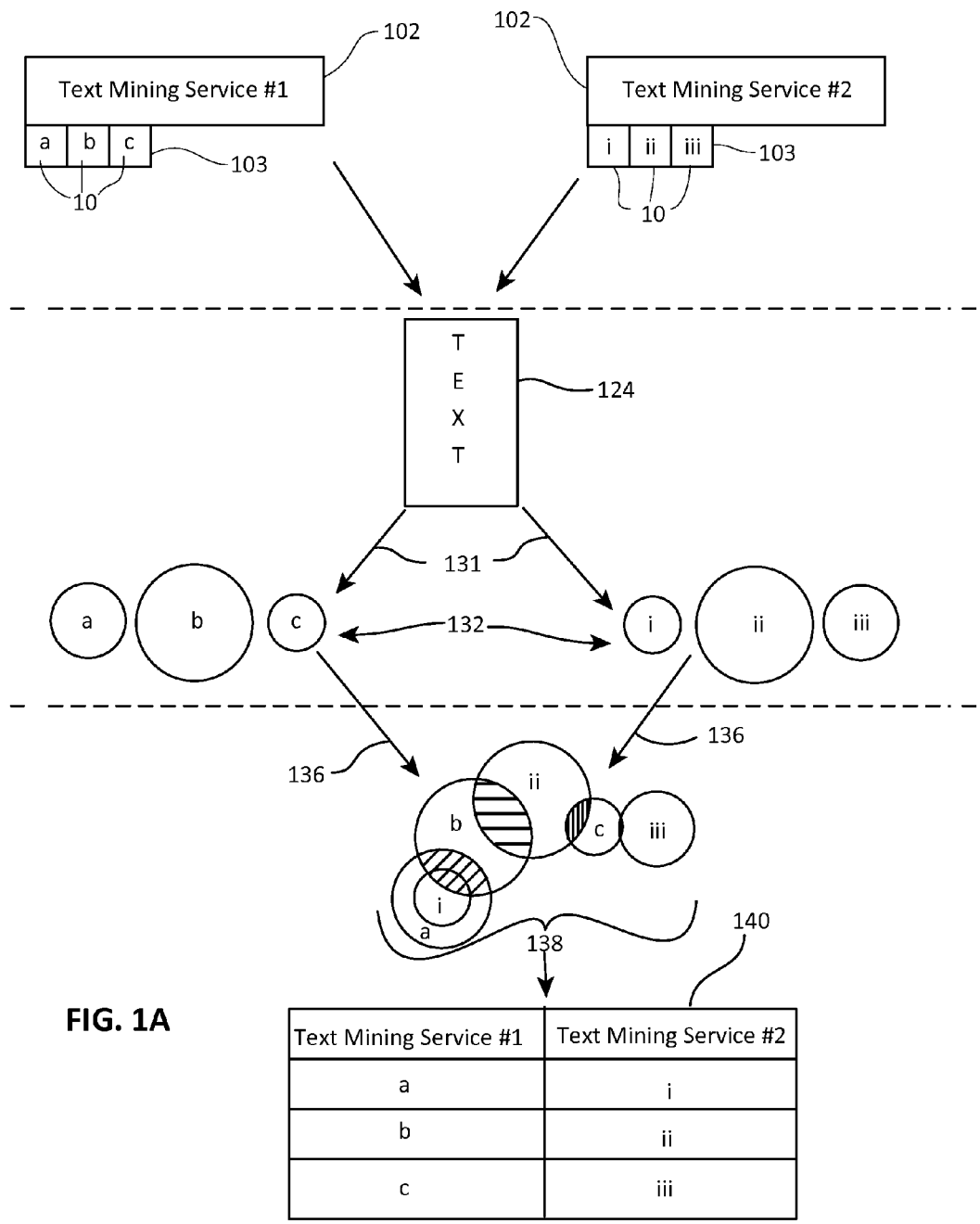
FIG. 1A is a schematic view showing the instance generation and auto-mapping functions according to an embodiment.

As is now illustrated in connection with FIG. 1A, the execution then integrates the result of the multiple text mining services by using additional components. First, an instance generation component 130 generates 131 instances 132 for each element 105 of the taxonomy 103 attached to the particular text mining service used. The instance generation process is described in detail below.

The generated instances are then forwarded to the auto-mapping component 134 that computes 136 a matching 138 between the different taxonomies. This matching is converted into a taxonomy mapping 140 may be saved in order to avoid repeated instance generation and mapping processes for similar taxonomies.

Figure 1B:
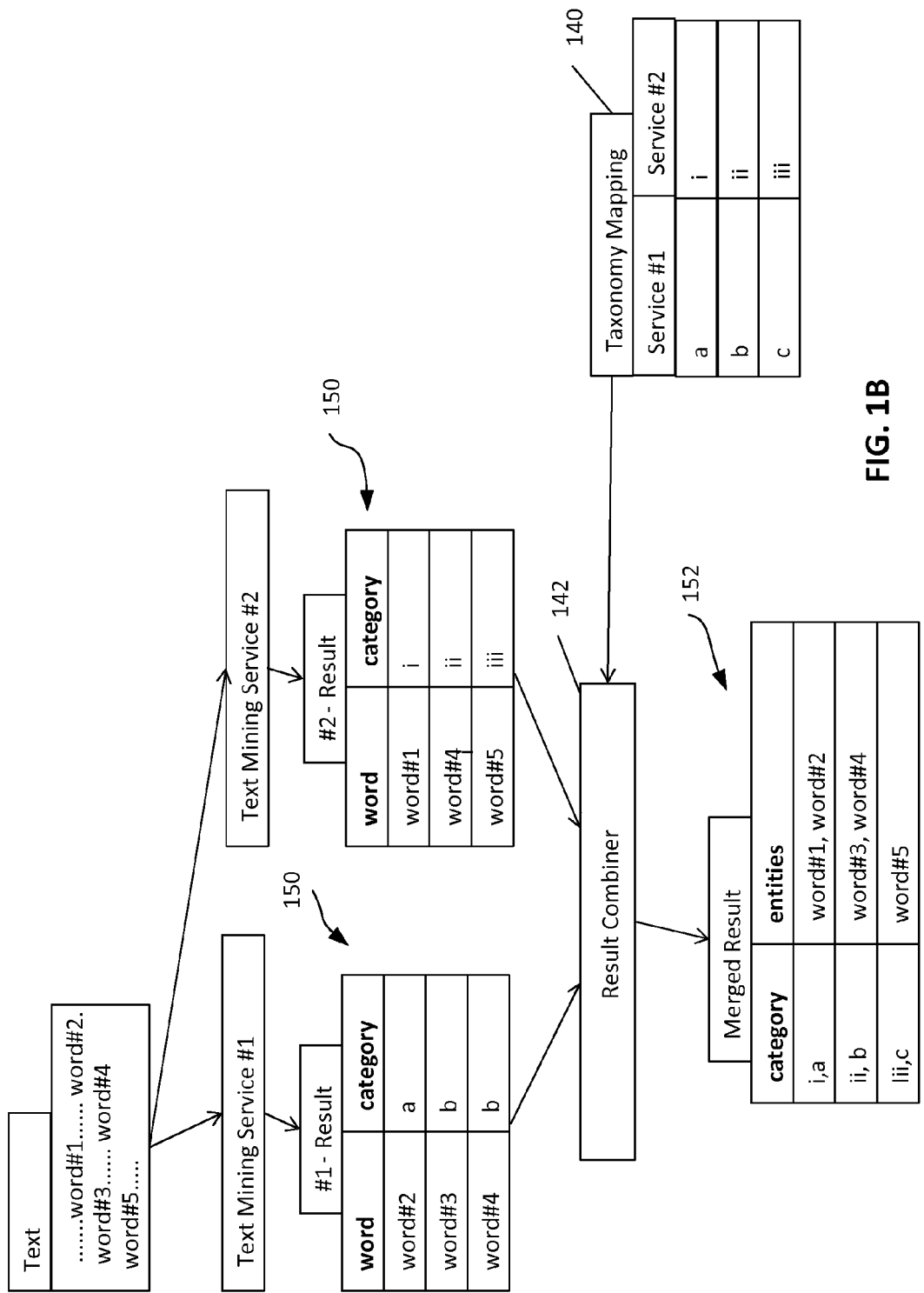
FIG. 1B is a schematic view showing the result combination according to an embodiment.

FIG. 1B is a schematic view showing the result combination according to an embodiment. The computed mapping 140 is then input to the result combiner 142, together with the extraction results 150 obtained from calling the different text mining services. The result combiner returns the merged result sets 152 to the execution, and finally to the User (or API).

The instance generation and auto-mapping functionality are now described in detail.

Obtaining a mapping between different text mining taxonomies can be challenging. Taxonomies can differ in such aspects as granularity, naming, and modeling style. Some mining taxonomies may comprise flat lists of types, while others taxonomies may exhibit facets or hierarchies (such as ISA hierarchies) to define structures between the entity types.

Even so, taxonomies may only be weakly structured and may comprise one or two levels. In addition, metadata within taxonomies may be scarce, and entity types may lack textual description.

Often, an exact match between entity types of two taxonomies may be difficult to define due to differing granularities. This can be the case when dealing with subtypes of entities, for example in attempting to match a "Person" and an "Actor" entity type.

Moreover, ambiguous entity types, and entity types related with each other such as "Politician" and "USPresident", may also pose difficulties in deciding for or against a mapping.

Owing to factors such as possible scarcity of available metadata and strongly differing taxonomy characteristics, conventional matching approaches relying on common ontologies may be difficult to implement.

To address this issue, embodiments may automatically enrich with instances, the entity types of various text mining service taxonomies. Generation of these instances in turn allows for the application of instance-based matching techniques.

EXAMPLE

Instance Generation

The following discussion focuses upon an instance generation process for matching Name Entity Recognition Taxonomies. According to various embodiments, however, the instance generation process may also be applicable to other types of taxonomies, including but not limited to relation and text classification taxonomies.

Instances of a taxonomy entity type can be obtained by executing the mining services on common text sources (documents), and collecting the entities and their actual instances recognized therein. Concrete instances of a taxonomy entity type (e.g., the text snippet "Barack Obama" in a specific text document) can be assigned to several taxonomy entity types (e.g. Person, Politician, USPresident).

In general, particular instances used in a matching process according to various embodiments, can be obtained by entering a number of text documents into each of the text mining services that is to be matched. Examples of such text mining services include but are not limited to Business Objects Text Analysis XI™, AlchemyAPI™, Evri™, and OpenCalais™.

The returned results are then clustered on the taxonomy entity type for each text mining service. In addition, the context (i.e., the document name) may be appended to each result.

In selecting arbitrary text documents, only a subset of the entity types from the extraction taxonomies tend to be enriched with instances. However, to achieve broader results based upon instance-based matching, the quality and quantity of the instances may be enhanced according to various embodiments.

An embodiment of an iterative instance generation process is as outlined as follows.

A first step comprises selecting articles covering a large number of different concepts, from a knowledge base (for example Wikipedia™). Due to scaling reasons, all of the articles may not be used, but a meaningful fraction may be obtained by randomly selecting articles (e.g. from the Wikipedia™ Featured Articles).

The instance generation process is then commenced with a limited number (e.g. 50) of such randomly selected articles.

As described below, the instance generation process may later be extended to additional documents, significantly increasing instance coverage.

The process may then proceed more tightly focused on the entity types, without any instances so far. The names of these entity types may be tokenized, and a search is performed with the particular extracted tokens.

For reasons relating to scalability, only the first results of this search may be fetched, and the returned articles are used to generate more instances.

In this particular example, the extracted tokens are used to explicitly search for Wikipedia™ lists. This is because a search is more likely to find instances for the entity type in a list connected to it (and possibly including an enumeration of instances), than in an article about the entity type.

EXAMPLE

Auto-Mapping

The specific characteristics of the taxonomies and their instances calls for a well-defined matching strategy. As stated above, metadata-based matching techniques may not be sufficient for automatically matching text mining taxonomies.

Thus according to embodiments, an instance matcher was implemented that can cope with the specifics of the instance sets created in the instance generation process. Such a matching strategy may combine the instance information with metadata such as taxonomy entity name, taxonomy entity annotation, and structural information of the taxonomy entity such as hierarchy.

The following discussion presents a matching strategy according to an embodiment. A formal notation is used to describe the matching problem between two taxonomies S (source) and T (target). The goal of the matching process is to find mappings between the entity types of the taxonomies S and T.

The following equation expresses one embodiment of a instance-matching procedure and measure for instance-based matching:

$$JCextend(S, T) = \frac{|S^i \cap T^i|}{|S^i \cup T^i| + (w_S - 1)|S^d| + (w_T - 1)|T^d|}$$

$$\text{with } S^d \subseteq S^i \setminus \bigcup_{A \in T} A^i, \ T^d \subseteq T^i \setminus \bigcup_{B \in S} B^i$$

$$\text{and } 0 \leq w_S \leq 1; \ 0 \leq w_T \leq 1$$

Here, the set of instances annotated by a type "X" is specified by $X^i$, its cardinality by $|X^i|$. The instance matcher may accommodate strongly differing instance set sizes, and only partly intersecting sets even for correct match pairs.

In this particular embodiment, weakening factors $w_S$ and $w_T$ tone down the effect of instances only found by one of the services. These weakening factors serve to correct the influence of the false positives and negatives of the NER process. Therefore the set of distinct instances $S^d$ and $T^d$ that were only extracted by one of the text mining services (independent from the entity type assigned to them) are integrated weakened by $w_S$ and $w_T$. Certain embodiments may choose $w_S = w_T = 0.5$ for the instance matcher.

A matching strategy may also consider the singularities presented for calculating a relatedness (R) of taxonomy entity types. A mapping M may thus comprise a triple (S,T,R), in which R indicates a relation between a type S∈S and a type T∈T. Thus in addition to the equivalence relation, the "sub-type of", "broader than", "narrower than", and "related to" relations (R) are also considered to capture the taxonomy specific characteristics. The "non-relatedness" relation may be excluded from R.

Figure 2:
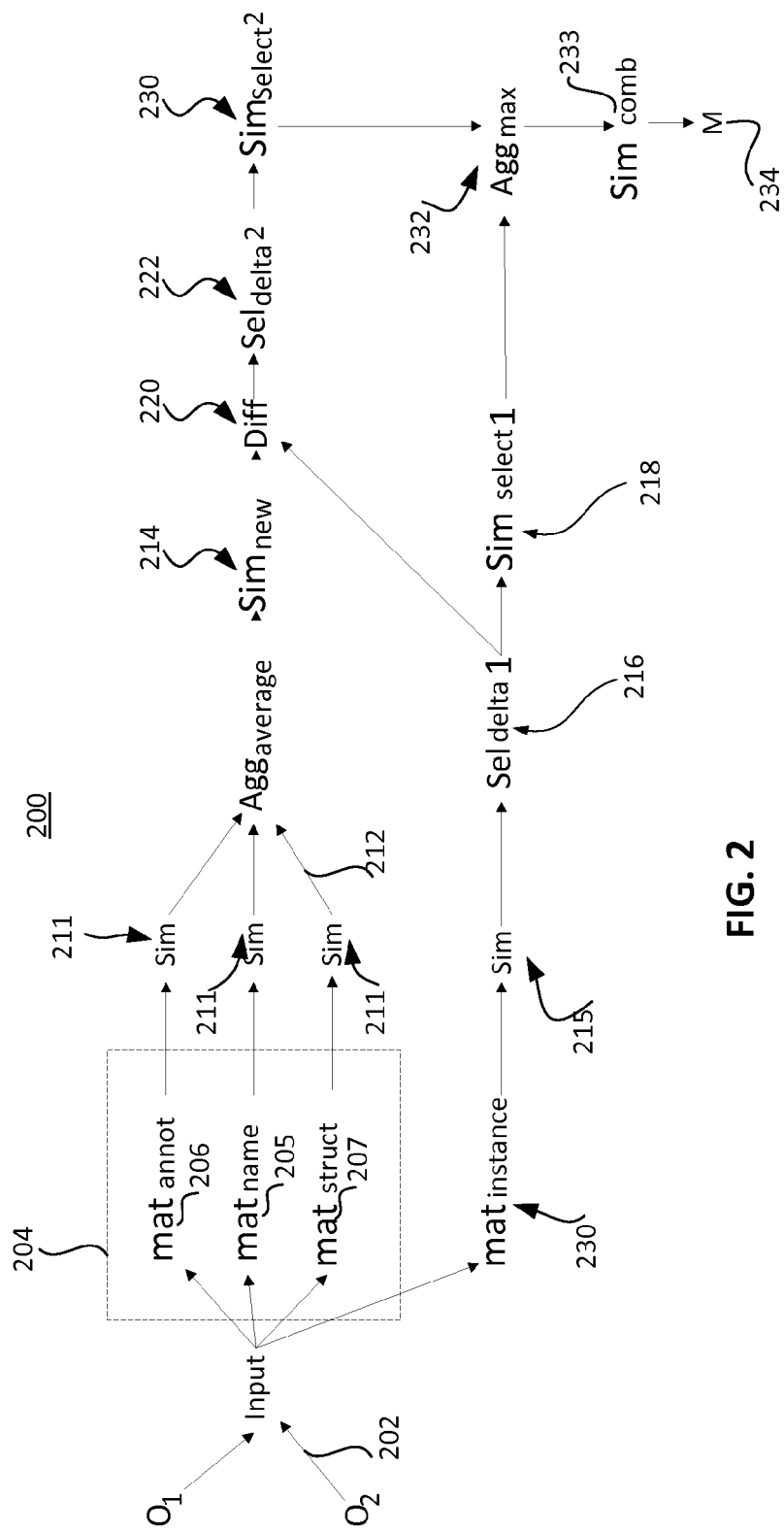
FIG. 2 is a simplified process flow showing the strategy of a matching strategy combining both metadata matching and instance matching in a single matching process.

In addition to the instance-based matching just described, some correspondences can be found using metadata-based matchers. Accordingly, a complex matching strategy may combine both metadata matching and instance matching in a single matching process The strategy of this matching process is shown in FIG. 2.

In particular, the matching process 200 first parses the two input taxonomies (ontologies $O_1$, $O_2$). The instance matcher 203 and the matchers 204 for metadata are then executed. In particular, the metadata matchers 204 comprise the taxonomy entity name matcher 205, the taxonomy entity description (annotation) matcher 206, and the taxonomy entity structure (hierarchy) matcher 207.

Each matcher creates a similarity matrix 211 comprising S*T entries. Each entry of the matrices is a value between 0 and 1, with 0 representing low similarity and 1 representing high similarity between two pairs of elements from the input ontologies.

The matching result from the three metadata-based matchers are aggregated 212 to a single similarity matrix ($S_{NEW}$) 214 using an aggregation operator ($Agg_{average}$). This operator takes the average of similarity entries as an entry for the new similarity matrix. However, this is not required, and other embodiments could aggregate differently, for example taking the Maximum or Minimum or by doing a majority vote on the four results for each pair.

The similarity matrix 215 of the instance matcher, is further processed within a selection operation ($Sel_{data}1$) 216 to create similarity matrix 218. This selection operation extracts the most probable matching pairs, and sets all other values to 0. In particular, the selection strategy delta takes the best values from each row and column from the similarity matrix. Select max-Delta strives for 1:1 relations, but also allows some 1:N relations to be identified. An instance based matching technique resulting in a high precision close to 1, indicates that selected correspondences are very likely a correct match.

However the recall may sometimes be much lower. Therefore, all found correspondences were subtracted from the resulting similarity matrix of the metadata based matchers using the difference operation (Diff) 220. Here, the rationale is to trust into correspondences found by the instance matcher, and hope to add additional correspondences from the metadata based matching approach.

The resulting matrix of the difference operation is selected using a second delta selection ($Sel_{delta}2$) operation 222 to create similarity matrix 230. This operation identifies additional entries in the similarity matrix that were not found by the instance-based matcher.

In this embodiment, the results of the two selected similarity matrices 218, 230 are then aggregated by operator ($Agg_{max}$) 232 to a single matrix ($Sim_{comb}$) 233 by simply taking the maximum of two entries. This aggregation behaves like a union of the found correspondences.

Finally, a mapping (M) 234 is created from the aggregated similarity matrix.

Figure 5A:
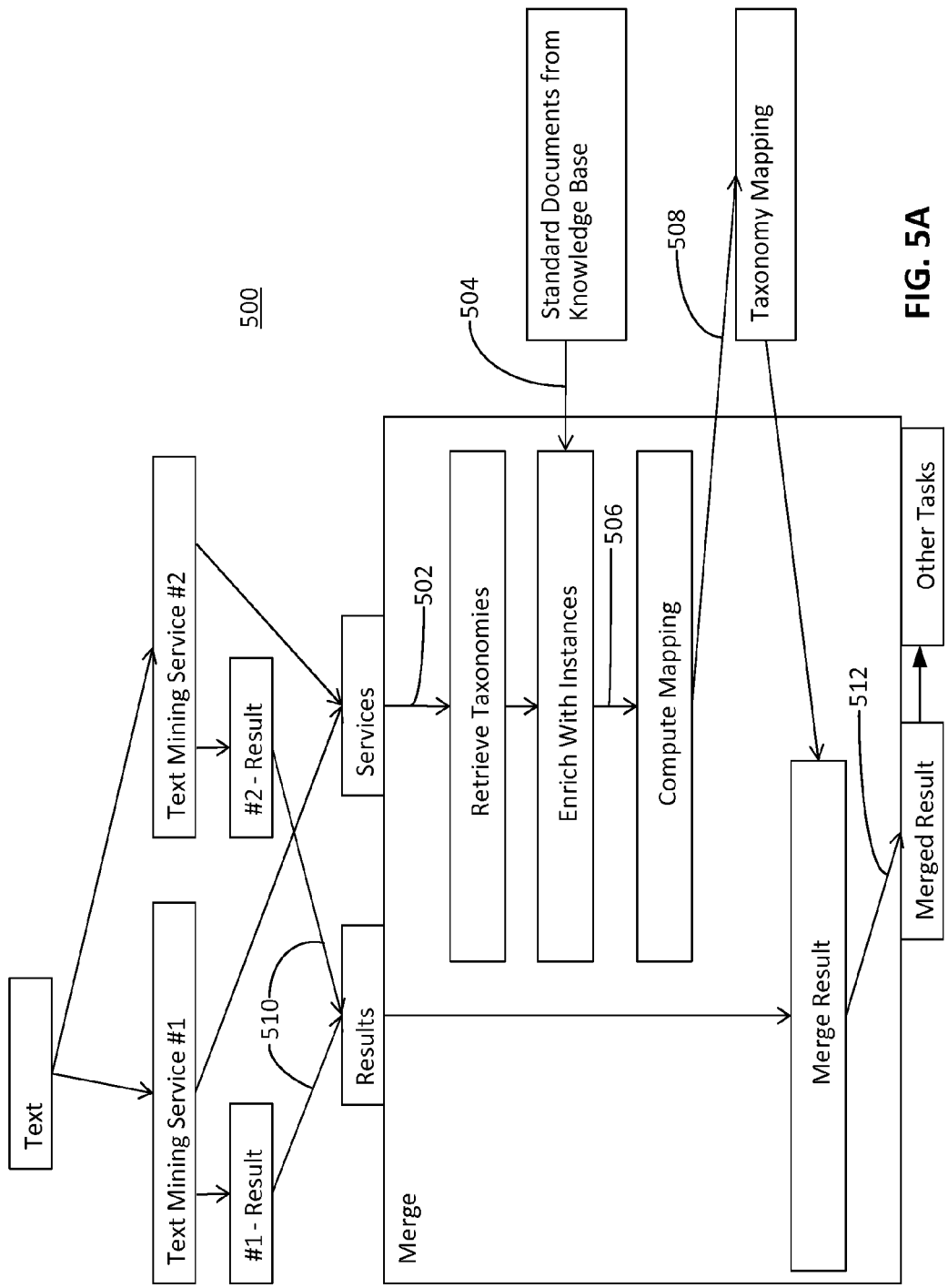
FIG. 5A depicts the process flow as a block diagram.

In summary, FIG. 5 presents a sequence of actions in an embodiment of a process flow. FIG. 5A depicts the process flow as a block diagram 500. In step 502, taxonomies of a first text mining service and of a second text mining service are retrieved.

In step 504, the taxonomies are applied to a knowledge base to generate a plurality of instances of an entity type of a first taxonomy. A second text mining service is applied to the knowledge base to generate a plurality of instances of an entity type of a second taxonomy. The plurality of instances of the first taxonomy and the plurality of instances of the second taxonomy are utilized to construct a matching procedure enriched with instances.

In step 506, a matching of the plurality of first taxonomy entity types to the plurality of the second taxonomy entity types is performed at least in part on the instance-matching procedure. In step 508, a taxonomy mapping is created based upon the matching.

In step 510, the first text mining service is applied to a target text document to produce a result comprising a plurality of first taxonomy entity types. The second text mining service is applied to the target text document to produce a result comprising a plurality of second taxonomy entity types.

In step 512, the mapping is used to create a merged task result that compares a result of applying the first text mining service to the target text document, with a result of applying the second text mining service to the target text document.

In later step(s) 514, other tasks may be performed, such as displaying the mining task result to a user.

EXAMPLE

Test Results

To evaluate the effectiveness of automatic combination services according to various embodiments, tests were run. First, extraction services and their taxonomies were taken from the web, and mappings were manually created between them. These manual mappings were used as a standard against which to evaluate the quality of the automatic matching strategy.

Three measures of effectiveness were used. The Precision measure reflected whether found matches agreed with the manual mappings. The Recall measure reflected how many of the possible correct matches were found. The FMeasure represented the harmonic mean of Precision and Recall.

Figure 6:
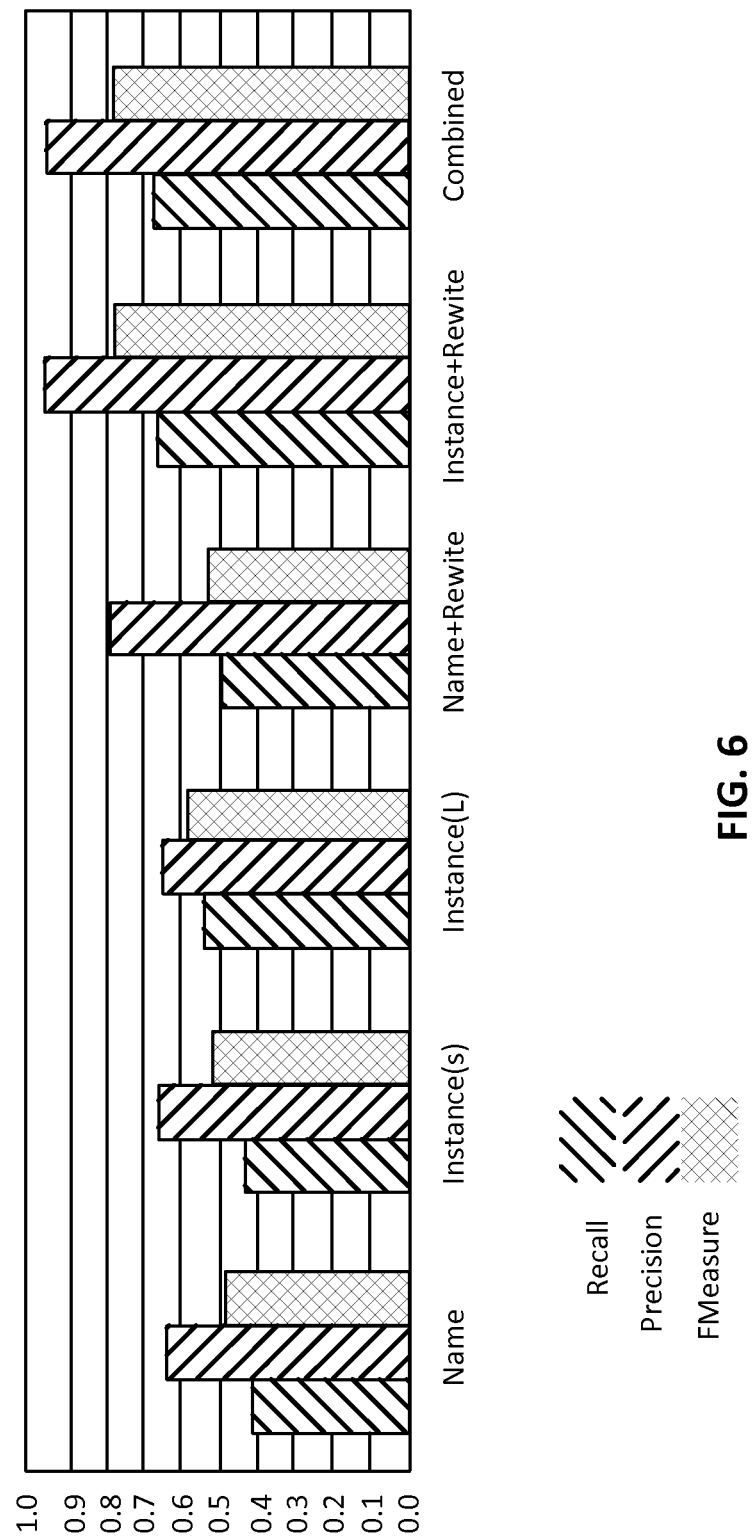
FIG. 6 is a bar graph showing text mining combination results according to various approaches.

As shown in FIG. 6, six different combination strategies were evaluated. A first strategy used only the metadata name for matching. A second strategy employed only the instance-matching with a smaller (S) set size. A third strategy employed only the instance-matching with an extended instance set of a larger (L) size.

In some cases, the instance matcher may return matches between elements of different granularity. Mapping rewrite techniques may accordingly be employed to refine the accuracy of the mapping. Examples of such mapping rewrite techniques include but are not limited to, populating child mappings to its parents if all (or a portion of) children of two categories match, as it is likely that also the parent category is a match. Mappings can also be populated from the parents to children, if the similarity of the children is high and number of children is equal.

There can also be corrective rewrite rules that remove conflicting mappings, for example if the granularity of mappings do not match. If there is a mapping from source parent to target child and source child to target parent, then the conflict can be resolved by rewriting the mapping to a parent to parent and child to child mapping.

Embodiments of rewrite rules could cover any post matching change in the mapping that is done based on assumptions of the intended result mapping. If the assumption is child to child and parent to parent then rewrite rules can be applied accordingly.

Such a mapping rewriting step can be particularly useful when employed in combination with the instance matching.

This is because overlapping instance sets indicate relatedness with high precision, but may not involve an exact match in granularity.

Accordingly, the fourth and fifth combination strategies shown in FIG. 6 further employ a mapping rewriting step. Here, the particular mapping rewriting techniques allowed the mappings to be corrected by incorporating the hierarchies and sub type mappings.

Finally, a sixth combination strategy of FIG. 6 included matching based upon both metadata (name) and instances, and further included the mapping rewrite technique.

Review of FIG. 6 indicates that an automatic combination of extraction results can be achieved with high quality. For example, implementation of instance matching achieved better results than did the name matching alone. Use of rewrite techniques further increased the average recall.

Even for the name matching result, some improvement was achieved by using the extend approach. Finally, the Combined strategy is more robust by putting instance and name matching results together. In particular, the recall was improved by including the name matching (metadata) results.

Automatic combination and mapping of text-mining services according to various embodiments may exhibit one or more properties.

- Certain embodiments may employ a matching procedure rather than relying upon an exact match to derive similarities.
- Some embodiments may automatically generate instances beforehand to apply instance matching, rather than relying upon instances already existing or that are provided manually.
- Particular embodiments may employ instance sets that are often very different in size and only intersect in a small part, with an intersection itself not implying a correct match.
- Various embodiments apply ontology matching techniques for matching text mining taxonomies.

Methods and systems according to various embodiments can be used for various purposes. For example, particular embodiments can be offered as a service in conjunction with an existing text mining solution, for example the Business Objects Text Analysis XI™ available from SAP AG. Such an embodiment could serve as an extension to that program, allowing integration of external extraction services into the existing text analysis tools, improving applicability and value.

Such combination of different services for specific use cases can increase quality and amount of extracted data. This can be of particular interest when text documents were generated in specific industries and domains where the Text Analysis solution was not designed for such as medical terms or in the bio domain.

Examples use cases include but are not limited to the following:

- mining text from invoices and emails from customers—for example in ByDesign™ or AP SRM™ available from SAP AG;
- mining text from Blogs and forum entries—for example in the SAP Community Network™ of SAP AG;
- mining text from the Web—for example Business Objects WebIntelligence™ of SAP AG;
- data cleansing—for example in Business Objects data services of SAP AG;
- mining TWITTER™ entries—for example from Event Insight™ of SAP AG (including extending Event Insight™ with information extraction techniques to derive events from appearing unstructured text sources such as TWITTER™)

Figure 3:
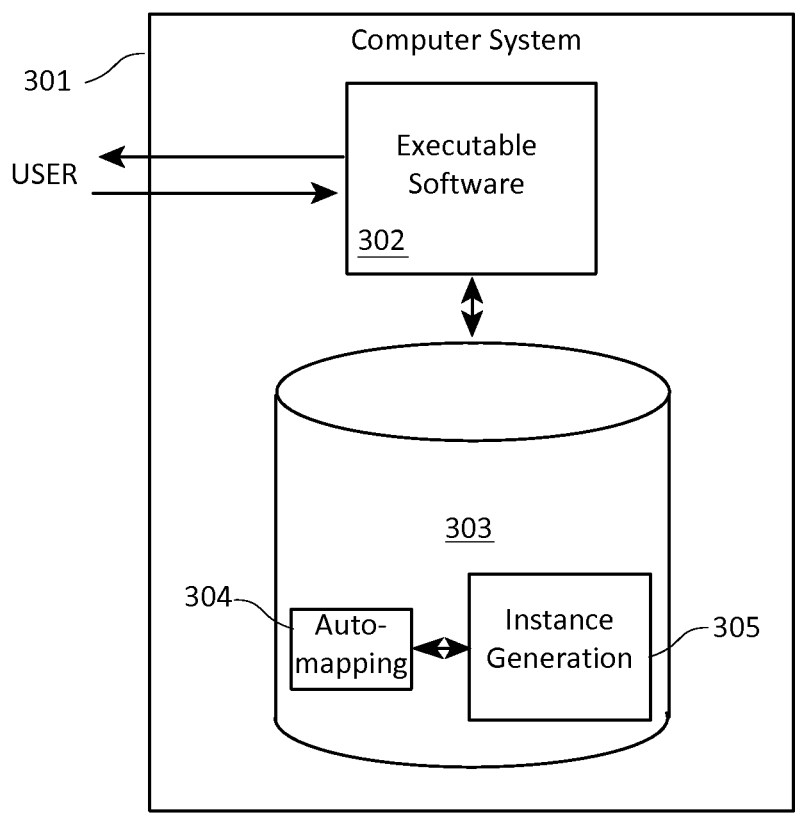
FIG. 3 illustrates hardware of a special purpose computing machine which may be configured to implement text mining combination in accordance with particular embodiments.

FIG. 3 illustrates hardware of a special purpose computing machine. This computing machine may be configured to implement text mining combination in accordance with particular embodiments.

In particular, computer system 300 comprises a processor 302 that is in electronic communication with a non-transitory computer-readable storage medium 303. This computer-readable storage medium has stored thereon code 305 corresponding to the instance generation element. Code 304 corresponds to the auto-mapping element. Code may be configured to reference data stored in a database of a non-transitory computer-readable storage medium, for example as may be located in a remote database server.

Embodiments of may be run in conjunction with a computer system which may comprise a software server. A number of software servers together may form a cluster, or logical network of computer systems programmed with software programs that communicate with each other and work together to process requests.

Figure 4:
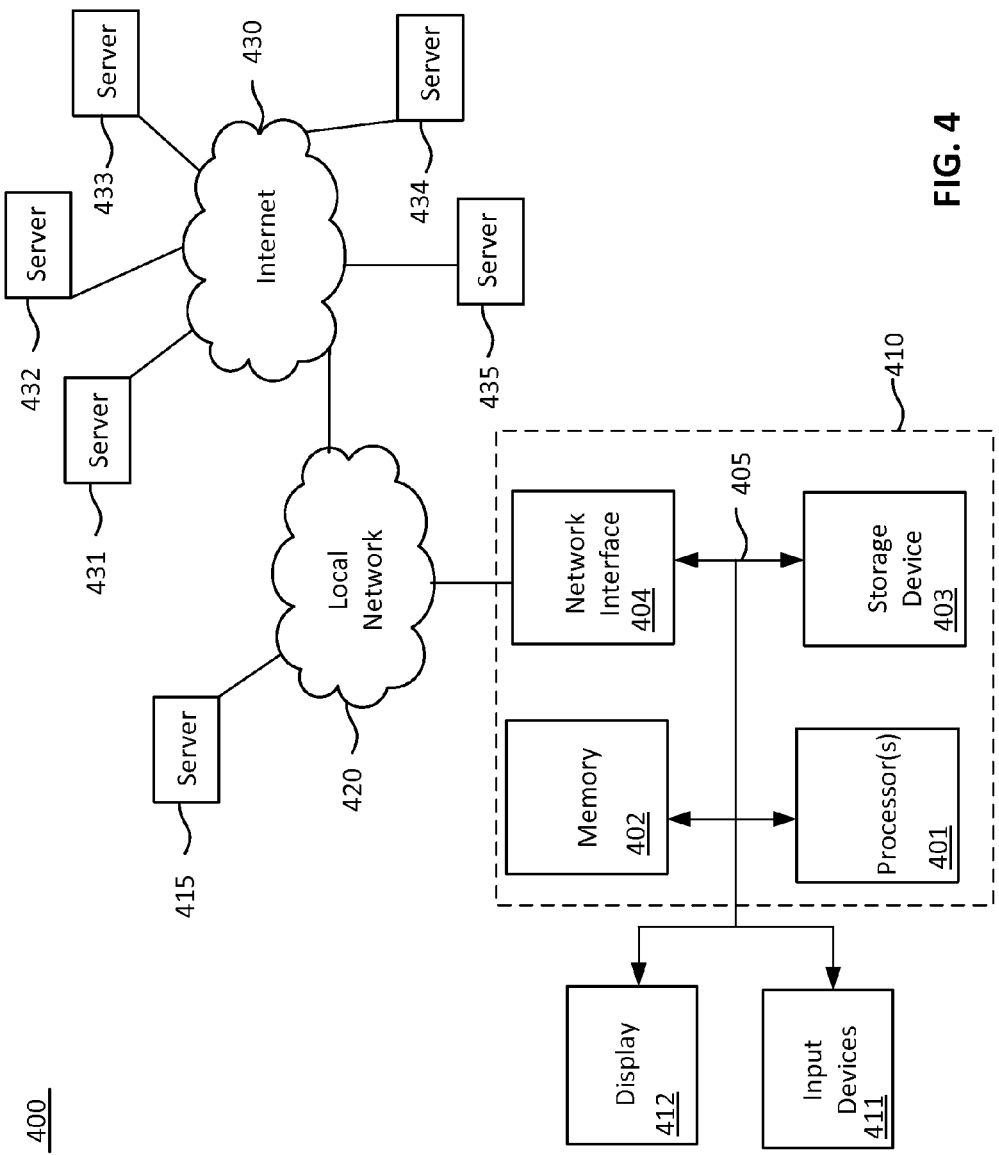
FIG. 4 illustrates an example of a computer system.

An example computer system 410 is illustrated in FIG. 4. Computer system 410 includes a bus 405 or other communication mechanism for communicating information, and a processor 401 coupled with bus 405 for processing information.

Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both.

A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read.

Storage device 403 may include source code, binary code, or software files for performing the techniques above, for example. Storage device and memory are both examples of computer readable media. The computer system generally described in FIG. 4 includes at least those attributes described in FIG. 3.

Computer system 410 may be coupled via bus 405 to a display 412, such as a cathode ray tube (CRT) or liquid crystal display (LCD), for displaying information to a computer user. An input device 411 such as a touch screen, is coupled to bus 405 for communicating information and command selections from the user to processor 401. The combination of these components allows the user to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be for Broadband Wireless Access (BWA) technologies. In any such implementation, network interface 404 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein.

In an example involving the Internet, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of combining text mining services that rely upon different taxonomies, the method comprising:
   applying a first text mining service relying upon a first taxonomy, to a knowledge base comprising a plurality of documents according to a first iterative instance generation process to generate a plurality of instances of an entity type of the first taxonomy;
   applying a second text mining service relying upon a second taxonomy, to the knowledge base according to a second iterative instance generation process to generate a plurality of instances of an entity type of the second taxonomy;
   utilizing the plurality of instances of the first taxonomy and the plurality of instances of the second taxonomy to construct an instance-matching procedure;
   applying the first text mining service to a target text document smaller than the knowledge base to produce a plurality of first taxonomy entity types;
   applying the second text mining service to the target text document to produce a plurality of second taxonomy entity types;
   creating a mapping of the plurality of first taxonomy entity types to the plurality of the second taxonomy entity types based at least in part on the instance-matching procedure;
   using the mapping to create a merged result that compares a result of applying the first text mining service to the target text document, with a result of applying the second text mining service to the target text document; and
   displaying the merged result to a user.

2. The method of claim 1 wherein:
   the first taxonomy comprises a first metadata and the second taxonomy comprises a second metadata; and
   creating the mapping further comprises comparing the first metadata and the second metadata.

3. The method of claim 2 wherein the first metadata comprises a first taxonomy entity type name, a first taxonomy entity type description, or a first taxonomy entity type location within a first taxonomy hierarchy.

4. The method of claim 1 further comprising:
   applying the first text mining service to a broadened common knowledge base that is larger than the knowledge base, in order to generate an extended plurality of instances of the entity type of the first taxonomy;
   applying the second text mining service to the broadened common knowledge base to generate an extended plurality of instances of the entity type of the second taxonomy;
   utilizing the extended plurality of instances of the first taxonomy and the extended plurality of instances of the second taxonomy to construct a refined instance-matching procedure; and
   creating the mapping of the plurality of first taxonomy entity types to the plurality of the second taxonomy entity types based at least in part on the refined instance-matching procedure.

5. The method of claim 1 wherein:
   the plurality of first taxonomy entity types comprises a first quantity (S);
   the plurality of the second taxonomy entity types comprises a second quantity (T); and
   an output of the instance-matching procedure comprises a similarity matrix comprising S*T entries, each entry reflecting a similarity between a first taxonomy entity type and a second taxonomy entity type.

6. The method of claim 1 further comprising using a mapping rewriting technique to revise the mapping.

7. A non-transitory computer readable storage medium embodying a computer program for performing a method of combining text mining services that rely upon different taxonomies, said method comprising:
   applying a first text mining service relying upon a first taxonomy, to a knowledge base comprising a plurality of documents according to a first iterative instance generation process in order to generate a plurality of instances of an entity type of the first taxonomy;
   applying a second text mining service relying upon a second taxonomy, to the knowledge base according to a second iterative instance generation process to generate a plurality of instances of an entity type of the second taxonomy;
   utilizing the plurality of instances of the first taxonomy and the plurality of instances of the second taxonomy to construct an instance-matching procedure;
   applying the first text mining service to a target text document smaller than the knowledge base to produce a plurality of first taxonomy entity types;
   applying the second text mining service to the target text document to produce a plurality of second taxonomy entity types;
   creating a mapping of the plurality of first taxonomy entity types to the plurality of the second taxonomy entity types based at least in part on the instance-matching procedure;
   using the mapping to create a merged result that compares a result of applying the first text mining service to the target text document, with a result of applying the second text mining service to the target text document; and
   displaying the merged result to a user.

8. The non-transitory computer readable storage medium of claim 7 wherein:
   the first taxonomy comprises a first metadata and the second taxonomy comprises a second metadata; and
   creating the mapping further comprises comparing the first metadata and the second metadata.

9. The non-transitory computer readable storage medium of claim 8 wherein the first metadata comprises a first taxonomy entity type name, a first taxonomy entity type description, or a first taxonomy entity type location within a first taxonomy hierarchy.

10. The non-transitory computer readable storage medium of claim 7 wherein the method further comprises:
applying the first text mining service to a broadened common knowledge base that is larger than the knowledge base, in order to generate an extended plurality of instances of the entity type of the first taxonomy;
applying the second text mining service to the broadened common knowledge base to generate an extended plurality of instances of the entity type of the second taxonomy;
utilizing the extended plurality of instances of the first taxonomy and the extended plurality of instances of the second taxonomy to construct a refined instance-matching procedure; and
creating the mapping of the plurality of first taxonomy entity types to the plurality of the second taxonomy entity types based at least in part on the refined instance-matching procedure.

11. The non-transitory computer readable storage medium of claim 7 wherein:
the plurality of first taxonomy entity types comprises a first quantity (S);
the plurality of the second taxonomy entity types comprises a second quantity (T); and
an output of the instance-matching procedure comprises a similarity matrix comprising S*T entries, each entry reflecting a similarity between a first taxonomy entity type and a second taxonomy entity type.

12. The non-transitory computer readable storage medium of claim 7 wherein the method further comprises using a mapping rewriting technique to revise the mapping.

13. A computer system configured to combine text mining services that rely upon different taxonomies, the computer system comprising:
one or more processors;
a software program, executable on said computer system, the software program configured to:
apply a first text mining service relying upon a first taxonomy, to a knowledge base comprising a plurality of documents according to a first iterative instance generation process in order to generate a plurality of instances of an entity type of the first taxonomy;
apply a second text mining service relying upon a second taxonomy, to the knowledge base according to a second iterative instance generation process to generate a plurality of instances of an entity type of the second taxonomy;
utilize the plurality of instances of the first taxonomy and the plurality of instances of the second taxonomy to construct an instance-matching procedure;
apply the first text mining service to a target text document smaller than the knowledge base to produce a plurality of first taxonomy entity types;
apply the second text mining service to the target text document to produce a plurality of second taxonomy entity types;
create a mapping of the plurality of first taxonomy entity types to the plurality of the second taxonomy entity types based at least in part on the instance-matching procedure;
use the mapping to create a merged result that compares a result of applying the first text mining service to the target text document, with a result of applying the second text mining service to the target text document; and
display the merged result to a user.

14. The computer system of claim 13 wherein:
the first taxonomy comprises a first metadata and the second taxonomy comprises a second metadata; and
creating the mapping further comprises comparing the first metadata and the second metadata.

15. The computer system of claim 14 wherein the first metadata comprises a first taxonomy entity type name, a first taxonomy entity type description, or a first taxonomy entity type location within a first taxonomy hierarchy.

16. The computer system of claim 13 further comprising:
applying the first text mining service to a broadened common knowledge base that is larger than the knowledge base, in order to generate an extended plurality of instances of the entity type of the first taxonomy;
applying the second text mining service to the broadened common knowledge base to generate an extended plurality of instances of the entity type of the second taxonomy;
utilizing the extended plurality of instances of the first taxonomy and the extended plurality of instances of the second taxonomy to construct a refined instance-matching procedure; and
creating the mapping of the plurality of first taxonomy entity types to the plurality of the second taxonomy entity types based at least in part on the refined instance-matching procedure.

17. The computer system of claim 13 wherein:
the plurality of first taxonomy entity types comprises a first quantity (S);
the plurality of the second taxonomy entity types comprises a second quantity (T); and
an output of the instance-matching procedure comprises a similarity matrix comprising S*T entries, each entry reflecting a similarity between a first taxonomy entity type and a second taxonomy entity type.

18. The computer system of claim 13 further comprising using a mapping rewriting technique to revise the mapping.

* * * * *